E. B. PAUL.
COIN HANDLING APPARATUS.
APPLICATION FILED NOV. 16, 1918. RENEWED FEB. 25, 1921.

1,390,584.   Patented Sept. 13, 1921.

Inventor
Edward B. Paul,
By his Attorneys
Pennie, Davis, Marvin & Edmonds

E. B. PAUL.
COIN HANDLING APPARATUS.
APPLICATION FILED NOV. 16, 1918. RENEWED FEB. 25, 1921.

1,390,584.

Patented Sept. 13, 1921.

Inventor
Edward B. Paul
By his Attorneys
Pennie, Davis, Marvin & Edmonds

UNITED STATES PATENT OFFICE.

EDWARD B. PAUL, OF LANCASTER, PENNSYLVANIA, ASSIGNOR TO LANCASTER AUTOMATIC MACHINE COMPANY, OF LANCASTER, PENNSYLVANIA, A CORPORATION OF DELAWARE.

COIN-HANDLING APPARATUS.

1,390,584.

Specification of Letters Patent. Patented Sept. 13, 1921.

Application filed November 16, 1918, Serial No. 262,767. Renewed February 25, 1921. Serial No. 447,807.

*To all whom it may concern:*

Be it known that I, EDWARD B. PAUL, a citizen of the United States, residing at Lancaster, in the county of Lancaster, State of Pennsylvania, have invented certain new and useful Improvements in Coin-Handling Apparatus; and I do hereby declare the following to be a full, clear, and exact description of the invention, such as will enable others skilled in the art to which it appertains to make and use the same.

The present invention which relates to coin handling apparatus has for its general object the improvement of apparatus of the type in which coins of various denominations are received in a receptacle from which they are discharged into an assorting mechanism wherein they are positioned according to their denomination. In connection with the assorting mechanism, there are coin-controlled counter actuating devices corresponding to the several denominations and acting upon a suitable register to count the coins as they are discharged from the assorting mechanism.

More specifically considered, the present invention seeks to improve various elements and details of construction of the apparatus shown in my copending application, Serial No. 58,997, filed November 1, 1915, wherein the apparatus, which is particularly intended for use as a fare register, includes a box into which coins are dropped and from which they are discharged periodically into a hopper from which, in turn, they are ejected into an assorting mechanism wherein they are positioned according to their denomination. Associated with the assorting mechanism are coin-controlled locking devices for normally holding the counter actuating means in inoperative position. When a coin is received in the assorting mechanism, it renders its corresponding locking devices inoperative, whereupon the counter actuating means associated therewith is released and actuates the counting devices in accordance with the denomination of the coin, thus registering the coins in terms of one of the denominations for which the register is designed.

It is a further object of the present invention to provide an improved form of register particularly adapted for use with the other elements of the apparatus and upon which all denominations of coins ranging from pennies to half-dollars may be collectively registered to show at any time the total amount of money that has been passed through the apparatus and assorted into different denominations.

While the apparatus may be employed to assort and count coins, and thereafter discharge coins of different denominations into corresponding receptacles from which they may be removed as desired, the utility of an apparatus of this character will be increased in many cases if means are associated therewith by which the coins, after they have been assorted and registered, may be stacked and wrapped in packages containing a predetermined number of coins of each of the denominations handled by the machine. The present invention accordingly provides, in combination with the assorting and registering mechanisms, apparatus by which the coins of each denomination are discharged into suitable receptacles adapted to hold wrappers, and when a predetermined number of coins have been placed within each wrapper, the latter is automatically closed to retain the coins therein.

The particular nature of the present invention, and other objects and advantages thereof, will appear more clearly from a description of a preferred embodiment in which the several features outlined above are combined in a unitary structure and arranged to coöperate with each other in such a manner that the entire apparatus operates automatically with great accuracy and reliability.

In the accompanying drawings in which such a preferred embodiment of the invention is illustrated.

Referring to the drawings in which similar reference characters denote similar parts through the several views, 1 is the casing of the apparatus which should preferably be constructed of metal and upon the top of which is a funnel 2 into which coins may be supplied. The lower end of the funnel is bent at a right angle and communicates with a rotary hopper 3 provided with an aperture as at 4, through which coins are discharged when the aperture occupies its lowermost position. The forward end of hopper 3 is movably mounted in a suitable bearing formed in the front wall 5 of the coin feeding mechanism into which the coins fall when they leave the hopper. The rear wall 7 of this mechanism supports at its upper edge a trunnnion 8 attached to the closed end of the hopper and carrying a gear 9 meshing with a pinion 10 on an axle attached to the wall 7, and having a gear 11 meshing with a pinion 12 mounted on an axle on the rear wall 7 and having a gear 13 which meshes with a pinion 14 on a shaft 15 mounted in a partition 16 extending between the side walls of the casing. Associated with the pinion 14 is a gear 17, which, through the train of gears and pinions 18, 19, 20 and 21, is connected to a shaft 22 mounted in a suitable bearing near the bottom of the partition 16. Slidably mounted on the end of shaft 22 is a cup-shaped member 23 adapted to be forced outwardly by a spring 24 surrounding the shaft. The member 23 serves as one part of a clutch, the other member 25 of which is attached to the shaft of a motor 26 suspended from a bracket 27 which, at its upper end, is provided with hooks 28 adapted to fit over pins attached to the rear walls of the casing, the arrangement being such that when the bracket is in place, the weight of the motor will tend to hold the clutch members 23 and 25 firmly in engagement to provide a driving connection between the motor and the moving parts of the apparatus.

Figure 1:
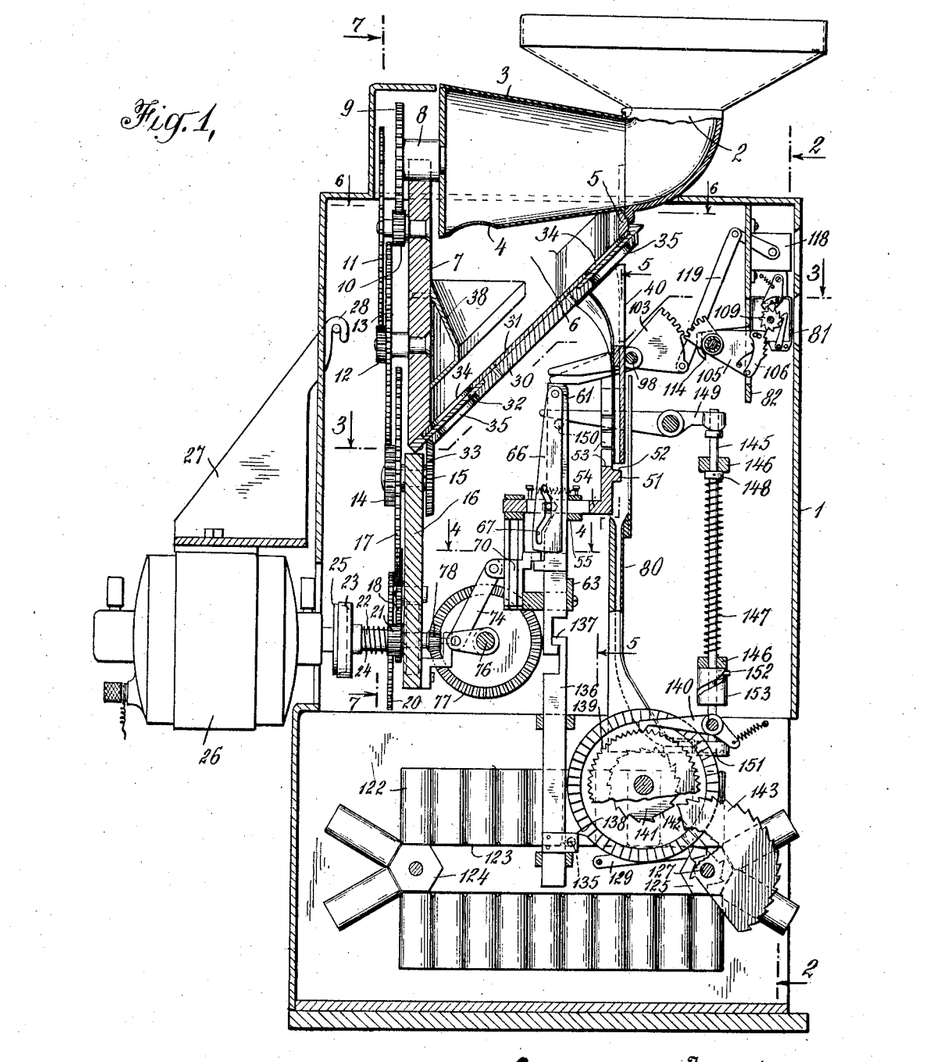
Figure 1 is a side elevation of the entire apparatus, chiefly in section.
Figure 6:
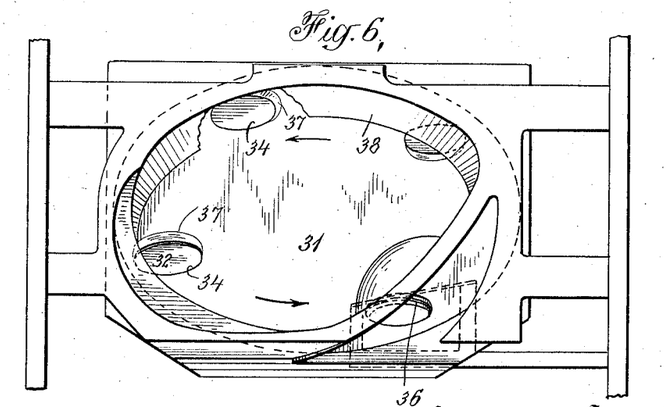
Fig. 6 is a plan view of the receptacle into which coins are supplied and by which they are fed one at a time into the assorting mechanism.
Figure 7:
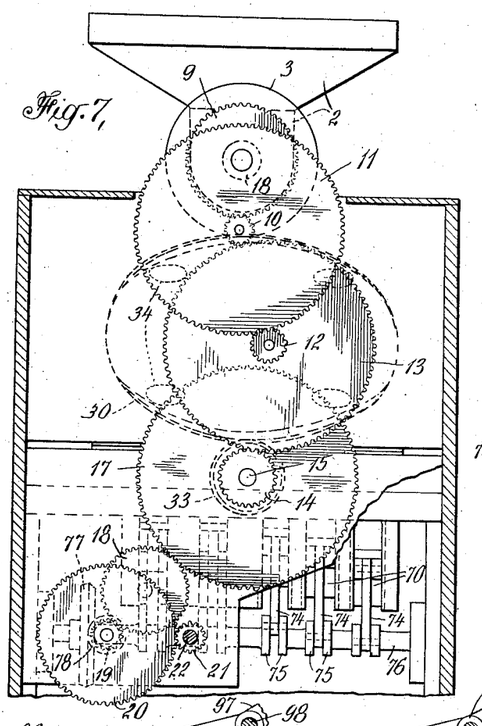
Fig. 7 is a rear elevation, showing the gear trains for driving various parts of the apparatus, the casing being taken in section along the line 7—7 of Fig. 1.

The coin feeding mechanism 6 into which coins are discharged from the hopper 3 appears most clearly in Figs. 1 and 6. It comprises a receptacle of oblong contour and considerably shorter at the front than at the back so as to provide for an inclined bottom. This bottom is made up of a lower plate 30 and an upper plate 31, connected together by pins or screws and between which is an annular support 32 attached to the lower edge of the wall of the receptacle. The combined plates 30 and 31 are thus rotatably mounted at the bottom of the coin-receiving receptacle, and for imparting rotation to these combined plates, the periphery of the lower plate is provided with beveled teeth meshing with a corresponding beveled gear 33 attached to the inner end of shaft 15 and hence driven by the motor 26. Each of the plates 30 and 31 is provided with registering apertures as at 34 and 35 respectively, of which four are shown in the present case, although any other number may be provided. The annular supporting member 32 is provided with one aperture in its uppermost portion, as at 36, adapted to register with each pair of apertures in the rotary plates as these apertures pass over the upper portion of their path.

As a further refinement of the construction, each aperture in the upper plate 31 should be disposed slightly in advance of its corresponding aperture in the plate 30 so that when a coin which has been carried upward in the recess formed by the aperture in the upper plate, reaches the point where the apertures register with the aperture in the annular member, the coin will be tipped over to insure its discharge into the assorting mechanism of the apparatus. Also, in order to permit coins to be easily taken up by the pockets formed by the apertures 34 and the annular plate 32 when these apertures are in their lowermost positions, the edges of the same should be somewhat beveled as indicated at 37 in Fig. 6. Attached to the rear wall 7 of the coin feeding receptacle, is a deflector 38 so constructed as to tip the coins as they fall into the lower part of the receptacle and prevent any of them from remaining on edge against the rear wall 7 with possible clogging of the coins in the receptacle.

The assorting device into which the coins are fed one at a time by the mechanism described above, appears most clearly in Fig. 5 from which it will be seen that it comprises a chute 40 which terminates a transversely extended, inclined run-way 41 divided into a plurality of coin-receiving pockets 42, 43, 44, 45 and 46, by the coin-engaging projections 47, 48, 49 and 50. In the embodiment shown, the apparatus is adapted to handle half-dollars, quarters, nickels, pennies and dimes, and the first projection 47 is adapted to engage half-dollars, retaining them in the pocket 42 and permitting all other coins to pass beyond. The second projection 48 engages the quarters, retaining them in the pocket 43 and allowing the other coins to pass on. The third projection 49 engages the nickels, retaining them in the pocket 44 and allowing the pennies and dimes to pass on, the former being caught by projection 50 and held in pocket 45 and the dimes passing to the end of the run-way, where they are held in pocket 46.

Each of the coin-receiving pockets is provided with an opening in its bottom through which the coin may pass as hereinafter described. The opening of each pocket is normally closed by means of a gate 51, it being understood that there is a separate gate for each pocket, and that the several gates and their associated parts are of similar construction.

Figure 5:
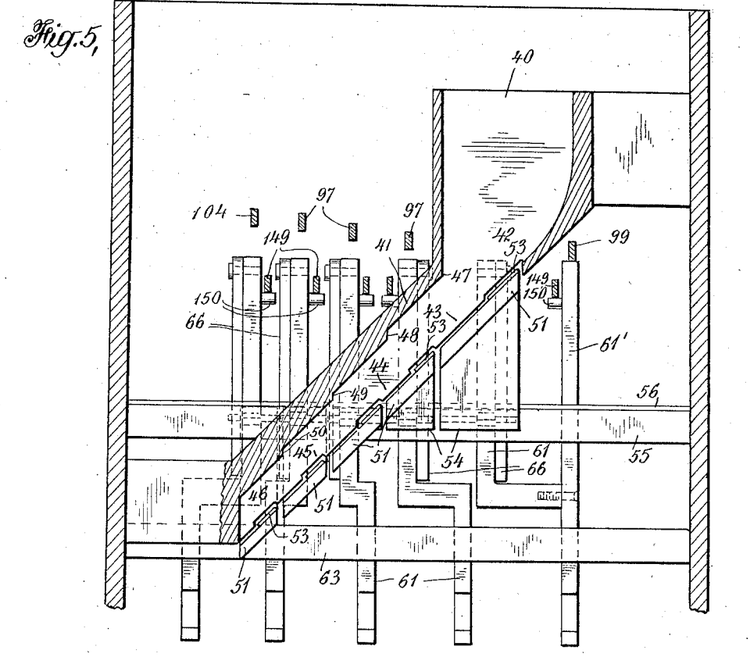
Fig. 5 is a front elevation of parts of the assorting and counter actuating mechanism in section along the line 5—5 of Fig. 1.
Figure 8:
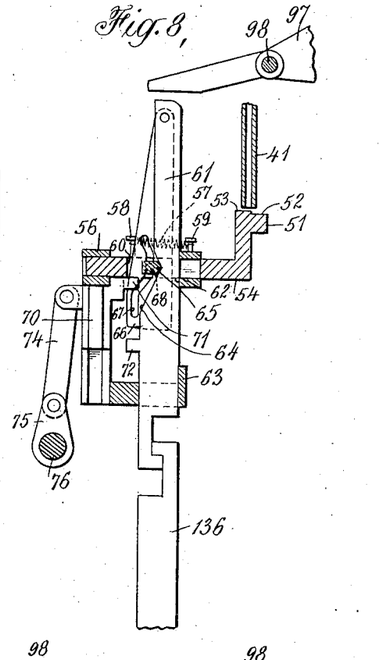
Figs. 8, 9, 10 and 11 are detailed views showing different positions assumed by the coin-controlled counter actuating devices, during a cycle of operations of the apparatus.

Each gate is composed of a shelf portion 52 and a step portion 53 spaced from the outer edge of the gate and which in the normal position of the gate lies beneath the corresponding opening in the bottom of the coin-receiving pocket, as shown most clearly in Fig. 8. Each gate is carried upon a horizontal slide 54 mounted between pairs of transverse supports 55 and 56 extending between the sides of the casing. Each slide is normally drawn forward by a spring 57 fastened at one end to a pin 58 attached to the slide and at the other end to a pin 59 on the upper one of the transverse supports 55. As appears most clearly in the plan view (Fig. 3), each of the slides 54 is cut away or slotted as at 60 to provide a space through which extends a reciprocating bar 61 which, as shown most clearly in Fig. 5, is composed of an upper vertical portion and a lower vertical portion, these portions being connected by a horizontal offset portion so that the lower portion is displaced to one side of the upper portion to bring the former into proper relation to the coin-wrapping mechanism as will hereinafter appear. The upper vertical portion of each bar is guided in slots formed in the transverse supporting members 55, as at 62, and the lower vertical portion of each bar is guided by a transverse member 63.

As shown most clearly in the detail views, Figs. 8 to 11, the upper portion of each bar is provided with a notch 64 having inclined sides of different length, and the bar is narrower above the notch than it is below. The notch is adapted to coöperate with a lug 65 extending from the slide 54, or between the sides of the slot in the slide in those cases where the reciprocating bars pass through slots instead of cut-away portions, as in the case of the slides for controlling the half-dollars and quarters. Pivoted to the top of each bar 61, is a depending swing 66 which is provided with a slot 67 within which is a pin 68 extending from the corresponding slide in alinement with the lug 65. As appears most clearly in Fig. 3, the swings associated with the units for controlling the half-dollars and quarters pass through the slots in the slides 54 of these units, but in the case of the other units, the swings are arranged at one side of the cut-away portions of the slides through which the reciprocating bars pass.

For actuating the bars 61 and swings 66, there are lifts 70 slidably mounted in vertical bearings between the transverse frames 56 and 63. Each lift is provided with a lug 71 adapted to coöperate with a corresponding lug 72 projecting from the rear face of the reciprocating bar. The upper forward edge 73 of the lift is adapted under certain conditions to engage the lower end of the corresponding swing 66 to raise it and the reciprocating bar to which it is attached. Each lift has lugs projecting from its rear face to which is attached a link 74 connected to a crank 75 on a transverse shaft 76 provided near one end with a bevel gear 77 meshing with a pinion 78 on the end of a stub shaft 79 which is the one on which the pinion 19 and gear 20 hereinbefore described are mounted. There is thus provided a driving connection from the shaft 22 which is driven by the motor 26 and the shaft 76 by which the lifts are reciprocated in their respective guideways.

The operation of the parts of the apparatus thus far described is as follows: Coins to be assorted are supplied to the hopper 3, which is rotated through the train of gears connecting it to the shaft 22, it being understood that the motor 26 is running, and the clutch members 23 and 25 are in engagement as shown in Fig. 1. As the aperture 4 in the hopper 3 passes over the lower portion of its path, coins will be discharged into the mechanism for feeding them one at a time to the coin-assorting devices. The coins in falling into the receptacle of the feeding mechanism will strike the deflector 38 and be turned so as to lie parallel to the rotary base 30, 31 of the feeding mechanism. Since this base is continually driven through the gear 15 associated with the driving gears of the apparatus, the coins lying upon the base will be continually agitated and picked up one at a time in the pockets 34 as the latter pass under the coins. As each pocket carries a coin upwardly, it will finally reach the point where the annular member 32 is cut away at 36, and when this occurs the coin will fall through the aperture into the chute 40 and drop into engagement with one of the projections 47, 48, 49 or 50, on the lower end of the run-way according to its denomination.

Figures 9, 10:
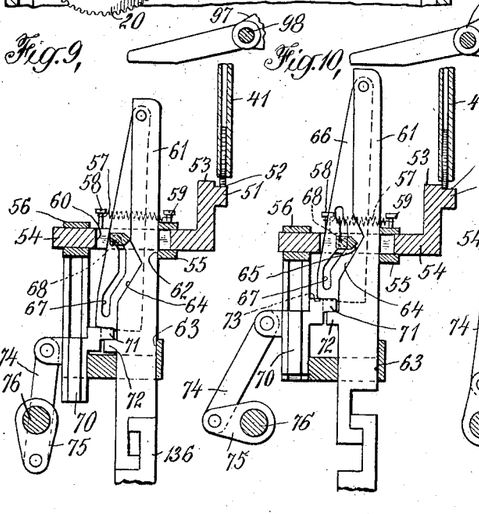

The gear train which drives the plates 30, 31 of the mechanism by which the coins are fed one at a time to the assorting apparatus, should preferably be so related to the mechanism for controlling the gates beneath the coin pockets, that the gates are operated in proper timed relation to the discharge of coins into the upper end of the coin chute to allow for the time taken by the coins to fall from the feeding mechanism through the chute to their respective pockets, so that when a coin reaches its receiving pocket, the corresponding slide 54 occupies the position shown in Fig. 8 with the top of the step 53 beneath the pocket, so that the coin rests thereon. At this time the corresponding reciprocating bar 61 occupies the position shown in this figure, being held by the lug 65 which is drawn into the bottom of the notch, and the swing 66 is drawn into the position shown by the slot and pin connection 67, 68. As the lift is drawn downwardly by the rotation of shaft 76, its lug 71 finally engages the coöperating lug 72 upon the reciprocating bar, drawing the latter downwardly into the position shown in Fig. 9. As the bar is drawn downwardly, the shorter face of its notch will through its engagement with lug 65 cause the slide 54 to be retracted into the position shown in Fig. 9 so that the coin will drop from the top of the step 53 onto the shelf 52, but the slide will not be retracted enough to release the coin. As the reciprocating bar is drawn downwardly to retract the slide 54, the pin 68 which lies within the slot 67 of the corresponding swing 66, will swing the latter into the position shown in Fig. 9 so that upon the following upward movement of the lift 70, the upper edge 73 of the latter will engage the lower rear edge of the swing and carry the latter and the reciprocating bar connected to it upwardly. As soon as the reciprocating bar begins to rise, the notch therein will release the lug 65 and the slide 54 associated therewith from its retracted position, and the spring 57 will tend to draw the slide forwardly, but such forward movement will soon be arrested by the step 53 coming into engagement with the edge of the coin, thus preventing the lug 65 from following the incline of the notch and holding it in a position with respect to the latter as indicated in Fig. 10. The slot 67 in the swing is so shaped that during the upward movement of the swing and the limited forward movement of the slide until the step engages the edge of the coin, the swing will be held toward the rear with its lower corner above the edge of the lift 70. As long as the swing is in engagement with the lift, the reciprocating bar will be raised, and in the present case this action will continue throughout the entire upward stroke of the lift, but after a slight rise of the reciprocating bar the longer face of its notch will engage the lug 65 and force the latter back to produce a corresponding movement of the slide 54 with the result that when the lift reaches its upper limit of movement, the slide will be retracted enough to remove the gate 51 from beneath the coin, thus allowing the latter to fall out of its pocket into a suitable chute 80 by which it is conveyed to a suitable receptacle, or, in the present embodiment, to mechanism for wrapping the coins.

The shaft 76 is continually driven and the lifts 70 are continually reciprocating, but it is only when a coin is in a pocket that the sequence of operations described above and illustrated in Figs. 8, 9, 10 and 11 will occur. At other times, that is, when there is no coin in a pocket, the corresponding reciprocating bar and its associated slide will normally occupy the position shown in Fig. 8, and when the corresponding lift passes downwardly to draw the bar into the position shown in Fig. 9, the slide will be retracted as above described. When there is no coin resting upon the gate, there will be nothing to prevent the forward movement of the slide to its normal position, so that the lug 65 following the shorter side of the notch will pass to the bottom of the notch as the bar rises, and the corresponding swing 66 will through the pin and slot connection be swung forward enough to draw its lower corner out of engagement with the top of the lift. This action will occur at the time when the lug 65 has reached the bottom of the notch in the reciprocating bar, so that the apparatus comes back to normal position, and the reciprocating bar is not lifted into the position shown in Fig. 11, although the lift 70 goes to its upper limit of movement.

Each of the shelves 51 and the mechanism associated therewith will go through the same sequence of operations, as described above, but owing to the length of the coin runway, the dimes and pennies will require an appreciably longer time to reach their respective pockets than will the coins of larger diameter. When each of the coins reaches its top, the corresponding shelf should be in the position shown in Fig. 8. In order to compensate for the different lengths of the paths over which coins of different denominations have to pass, the cranks 75 are angularly displaced upon the shaft 76 with relation to each other, so that their lifts 70 cause the corresponding reciprocating bars and slides to be operated in proper timed relation to each other.

Figure 2:
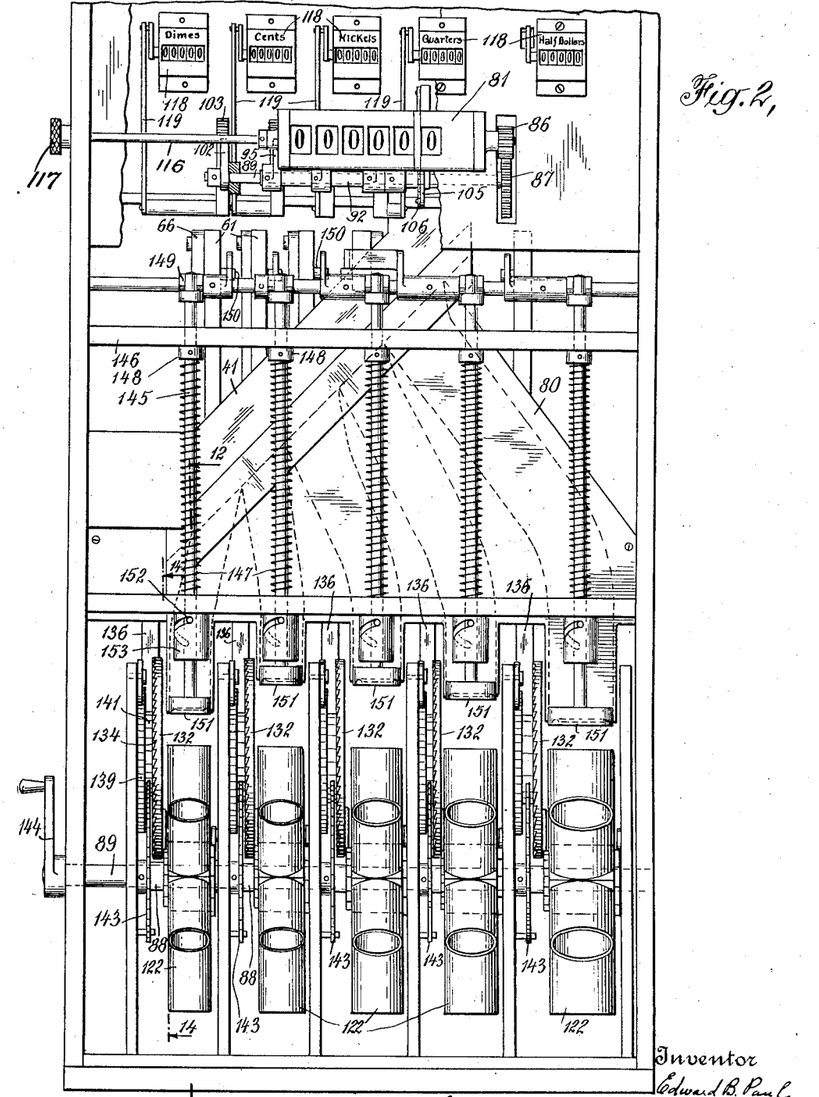
Fig. 2 is a front elevation in section along the line 2—2 of Fig. 1.
Figure 3:
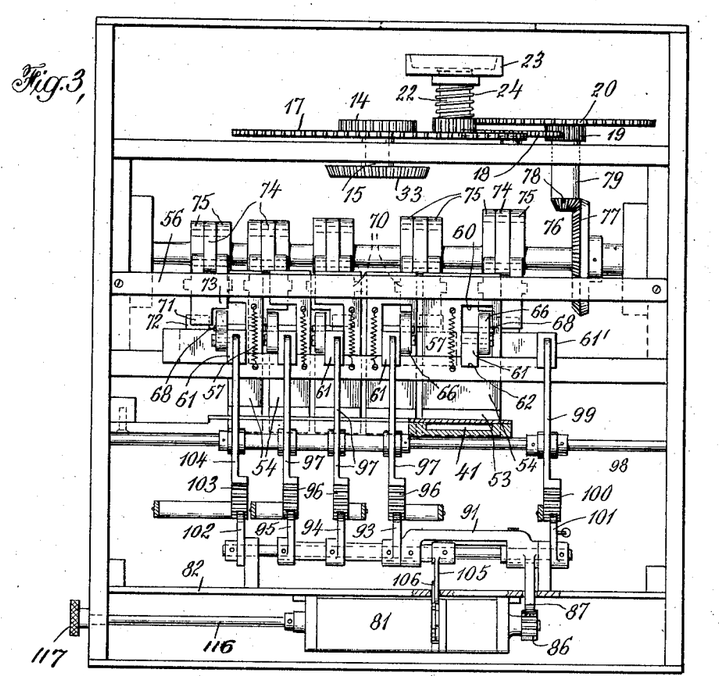
Fig. 3 is a plan view in section along the line 3—3 of Fig. 1.
Figure 4:
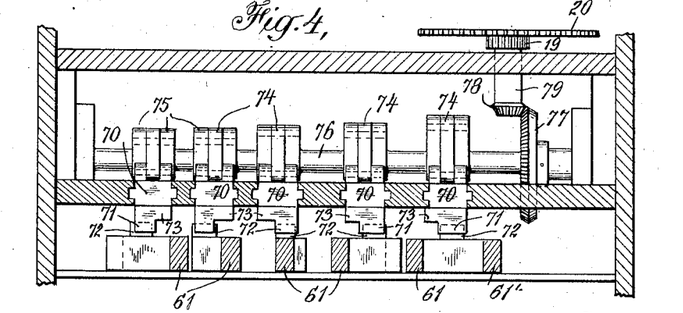
Fig. 4 is a plan view in section along the line 4—4 of Fig. 1.
Figure 11:
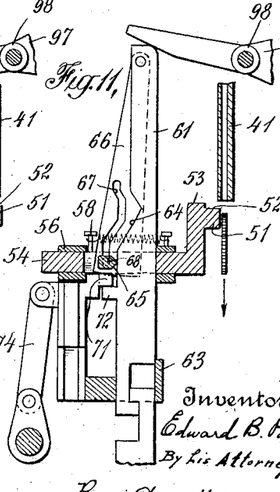

In the apparatus described above, the rise of the reciprocating bars into the positions shown in Fig. 11 is employed to actuate the register of the present invention, which is shown in detail in Figs. 17 to 21, while its relation to the other elements of the apparatus appears most clearly in Figs. 1, 2 and 3. The register comprises a casing 81 suitably mounted upon a bracket 82 within the casing of the apparatus which is provided with suitable openings through which the register may be observed. The register comprises a series of counters each numbered from 0 to 9, as is customary in devices of this character. The two counters 83 and 84 register in terms of cents, while the remaining ones register in terms of dollars, and as many of these may be used as desired. The counter 83 is operated from a shaft 85, having at its outer end a pinion 86 engaged by a sector gear 87 projecting from a sleeve 88 which is loose upon a shaft 89 mounted in suitable bearings 90, projecting from the bracket 82. The sleeve 88 is connected by a bridge piece 91 with a similar loose sleeve 92 upon which are fixed sector gears 93, 94 and 95, meshing with gears 96 on the ends of arms 97 which are pivoted on a transverse axle 98 mounted between the sides of the casing. The arms for operating the gears 93, 94 and 95 extend rearwardly a sufficient distance to lie in the path of the bars 61 associated with the quarters, nickels and pennies units, respectively.

Figure 17:
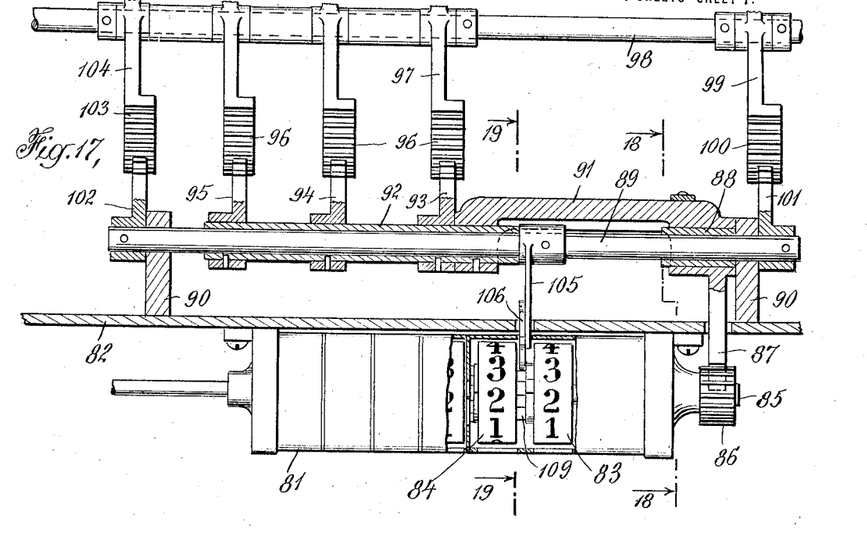
Fig. 17 is a plan view of the register, partly in section.

Upon the axle 98 is also mounted an arm 99 having its rear end in position to be engaged by a bar 61' associated with the bar 61 of the half-dollar unit, and this arm is provided with a gear 100 meshing with a gear 101 attached to one end of the shaft 89. A similar gear 102 is attached to the other end of this shaft and engages a gear 103 on an arm 104, the inner end of which is in position to be engaged by the bar 61 associated with the unit for controlling the dimes. The shaft 89 also has attached thereto between the sleeves 88 and 92 a sector 105 which extends through a slot in the bracket 82 into the casing of the register. Pivoted to the lower corner of the sector 105 is an arm 106 provided with teeth along its upper outer edge, and normally pressed outwardly by a spring 107, the outward movement of the arm being limited by a pin 108 in a slot at the upper end of the arm.

The teeth on arm 106 are adapted to engage a ratchet 109 associated with the second counter 84 of the register, and a spring-pressed pawl 110 also engages this ratchet for preventing reverse rotation. Associated with the first counter 83 is a tooth 111 which when the counter moves from 9 to 0 acts upon an arm 112 which is provided with a pivoted pawl 113 adapted to engage the ratchet 109 of the second counter, thus actuating the latter after each complete revolution of the first or units counter.

Figures 18, 19, 20, 21:
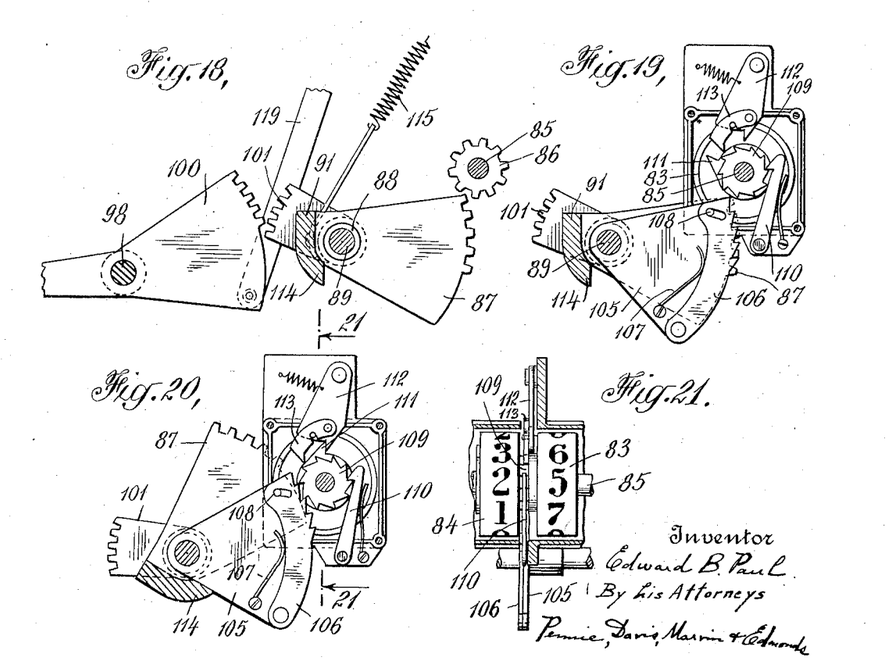
Fig. 18 is a transverse section along the line 18—18 of Fig. 17.
Figs. 19 and 20 are transverse sections along the line 19—19 of Fig. 17, showing elements of the register in different stages of operation.
Fig. 21 is a partial section along the line 21—21 of Fig. 20.

As shown most clearly in Figs. 18, 19 and 20, the bridge piece 91 is formed with an extension 114 which is adapted to engage the under face of the sector 105 at a certain stage in the operation of the register. A spring 115 is connected to the casing of the apparatus at any convenient point and also to the bridge piece 91, so as to normally hold the latter and the gears associated therewith in the positions shown in Figs. 18 and 19. The counters of the register may be reset to zero position by a rod 116 connected to a button 117 on the outside of the casing.

The register described above is for the purpose of totalizing the amount of money that is handled by the apparatus, but in case it is desired to determine the number of coins of each denomination that have passed through the apparatus, individual registers 118 may be provided. Each of these individual registers may be operated from the corresponding arms 97, 99 or 104 by a link connection 119 between the operating arm of the register and the arm which is actuated by the corresponding reciprocating bar.

In the operation of the register described above, let it be assumed that a penny has passed into the coin chute and been retained in its pocket. The mechanism of the corresponding unit will go through the sequence of operations described in connection with Figs. 8, 9, 10 and 11 with the final result that its reciprocating bar 61, as it rises to its highest position, will engage and rotate the arm 97 which operates the gear 95. The rotation imparted to sleeve 92 will through bridge piece 91 and gears 87 and 86, rotate the shaft 85 enough to move the first counter one unit to show that a penny has passed through the apparatus. It will be understood that suitable means are provided for preventing backward movement of the counter as the actuating mechanism is restored to its normal condition. When a nickel falls into its coin-receiving pocket, the coin-controlled mechanism will go through the cycle of operations hereinbefore described, but in this case the corresponding arm 97 is so arranged that it is engaged by the upper end of the reciprocating bar 61 and swung through an arc which is five times as long as the arc through which the arm associated with the penny mechanism is swung so that the movement imparted to shaft 85 will move the first counter 83 five spaces to register a nickel, it being understood that if such movement of this counter causes it to pass beyond 9, the second counter will be moved one unit to show the correct total.

If a dime is to be counted, the upward movement of the corresponding reciprocating bar 61 swings the arm 104 which through the gears 103, 102, shaft 89, sector 105, arm 106 and ratchet 109 will impart a movement of one unit to the second counter, thus adding ten cents to the amount indicated by the register. If a quarter is to be counted, the first effect of the rise of the corresponding reciprocating bar 61 will be to swing the associated arm 97 through a sufficient distance to cause the gears 96, 93, bridge piece 91 and gears 87 and 86 to rotate the shaft 85 enough to register five cents on the first counter. The registration of twenty cents more is effected by a further swing of the arm 97 so that the portion 114 of the bridge piece 91 engages and lifts the sector 105 enough to cause the arm 106 to advance the second counter two units. By virtue of the sequence of operations described above, there is added to the first and second counters of the register a total of twenty-five cents, but if during such registering operation either of these counters reaches 9 units, the indication will be transferred to the next counter to give the correct total. In the case of a half-dollar, the bar 61' will swing the arm 99 through a sufficient distance to cause the gears 100 and 101 to rotate shaft 89 and sector 105 enough to move the second counter five units, thus adding fifty cents to the indications of the register, it being understood that if this summation causes the counter to pass 9 units, the indications will be transferred to the third counter to show the total in terms of dollars and cents.

Figures 12, 13, 14, 15, 16:
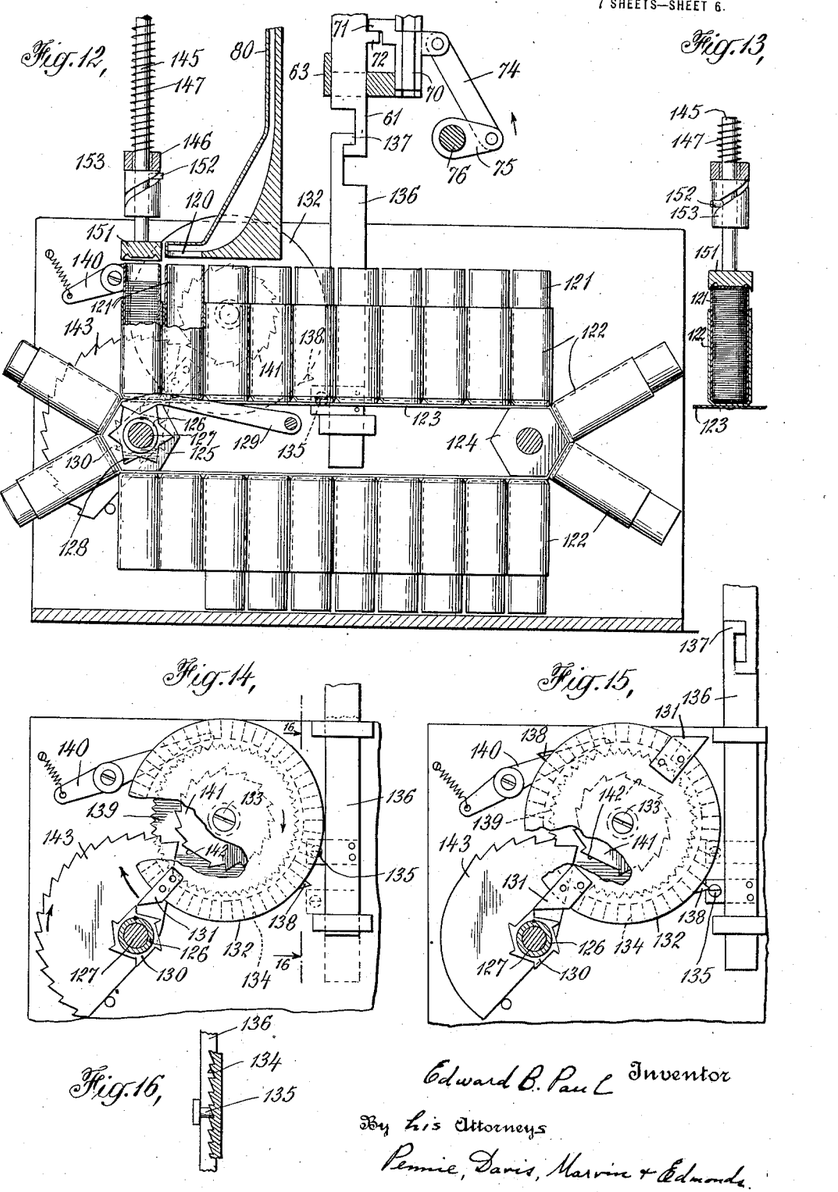
Fig. 12 is an elevation of the coin-wrapping mechanism, taken in section along the line 12—12 of Fig. 2.
Fig. 13 is a detailed view of the mechanism for crimping the end of a wrapper about one end of a stack of coins.
Fig. 14 is a view in elevation of the operating parts of mechanism adapted to wrap a predetermined number of coins.
Fig. 15 is a view of similar parts of a mechanism for wrapping a different predetermined number of coins.
Fig. 16 is a detailed view of the operating connection between the counter actuating devices and the wrapping mechanism, taken along the line 16—16 of Fig. 14.

The apparatus thus far described may be used for assorting and counting coins which are then discharged into suitable receptacles from which they may be removed as desired, but in many cases the utility of the apparatus will be increased if means are provided for wrapping the coins. For this purpose there is associated with the apparatus a separate mechanism for wrapping coins of each denomination, and since these wrapping mechanisms are of similar construction, a description of one unit will suffice to show the operation of all of the others. The coins after being discharged from their respective pockets and counted fall through the chutes 80 which are provided at their bases with horizontal apertures as at 120 to cause the coins to be discharged in horizontal position into a suitable wrapper 121 which will usually be in the form of a paper receptacle closed at its lower end. Each wrapper is contained within a pocket 122 and a number of these pockets are connected at their bases to an endless belt 123 which passes over wheels 124 and 125 having flat faces of a width corresponding substantially to the diameter of the pockets. The rear wheel 124 is mounted upon a shaft between suitable side frames attached to a base which may be detachably secured within the casing of the apparatus, thereby permitting the wrapping mechanism to be removed as a whole. The forward wheel 125 is mounted upon a sleeve 126 loose upon a shaft 127 common to all of the units of the wrapping mechanism. At one end of the sleeve is a star wheel 128 engaged by a holding pawl 129 to prevent accidental movement of the sleeve. At the other end of the sleeve is a ratchet 130 adapted to be engaged by a pawl 131 on a wheel 132 rotatably mounted on a stub shaft 133 and provided on one face with ratchet teeth 134 which are engaged by a spring actuated pawl 135 on a reciprocating bar 136 which at its upper end has a lost motion connection as at 137 with the lower portion of the corresponding reciprocating bar 61. In addition to the ratchet teeth 134, the wheel 132 is provided with one or more extended ratchet teeth 138. At this point it may be explained that the wheel shown in Fig. 14 is provided with fifty effective ratchet teeth 134, one extended ratchet tooth 138 and one actuating pawl 131, this wheel being adapted to be used in cases where it is intended that fifty coins of one denomination shall be supplied to a wrapper. In the case of the wheel shown in Fig. 15, there are two actuating pawls 131 arranged diametrically opposite each other, and two extended teeth 138 arranged in the same relation. The wheel 132 is provided with twenty effective ratchet teeth 134 on each semi-circumference between the extended teeth 138. This wheel is adapted for use in those cases where twenty coins of any denomination are to be supplied to a wrapper. It will be understood that wheels provided with other numbers of teeth may be used according to the number of coins which it is desired to supply to a wrapper.

There is associated with the wheel 132 a toothed wheel 139 engaged by a spring actuated holding pawl 140 to prevent accidental movement of the wheel 132. There is also associated with the wheel 132 a ratchet wheel 141 having at the point 142 a double space between its teeth, and this double space coincides with the point at which the pawl 131 is attached to the wheel 132, as shown in Fig. 14, or in the case of Fig. 15, there are two double spaces each coinciding with one of the pawls 131. Each unit of the wrapping mechanism has a segmental gear 143 mounted on shaft 127 and having teeth adapted to engage the teeth of the corresponding ratchet 141. The shaft and all of the gears 143 attached thereto may be manually operated by means of a crank 144 attached to one end of the shaft outside of the casing.

For the purpose of automatically crimping the upper ends of the wrappers after they have been filled with coins, there is provided for each coin wrapping unit a rod 145 mounted in transverse bearing members 146 and normally lifted by a spring 147 pressing against the lower bearing member at its bottom end and at its upper end against a shoulder 148 attached to the rod. The upper end of the rod passes through a slot in the end of a pivoted arm 149, and is provided with a shoulder against which the end of the arm bears. The other end of the arm is adapted to be engaged by a pin 150 projecting from the corresponding reciprocating bar 61, so that upon each upward movement of this bar, the arm is swung to depress the rod 145. To produce the crimping effect, it is necessary that the crimping head 151 be given a rotary movement at the same time that it is being depressed. This is obtained by providing the rod 145 with a pin 152 which travels through a slot in a member 153 attached to the lower transverse member 146 and through which the rod 145 passes.

The coin-wrapping apparatus described above operates as follows: At the time when a pocket having an empty wrapper therein is in position beneath the aperture 120 at the end of the chute 80, the corresponding wheel 132 occupies the position shown in either Figs. 14 or 15, which figures, as explained above, show wheels corresponding to different numbers of coins that are to be supplied to a wrapper. Each time that a coin of any particular denomination passes through the apparatus the corresponding reciprocating bar 61 will be raised to its upper limit of movement, and through the connection with the bar 136 will lift the latter enough to carry the pawl 135 over one of the teeth 134 of the wheel 132. When the bar 61 is carried to its lower position, it will push the bar 136 down, and the pawl 135 will advance the wheel 132 the space of one tooth. Each time a coin of like denomination passes through the apparatus, there will be a corresponding advance of the wheel 132 of the wrapping mechanism for this particular denomination, but at other times the bar 61 will not be raised enough to lift bar 136 on account of the lost motion connection 137 between these bars. In the case of the wheel shown in Fig. 14, after the same has been advanced fifty steps from the position shown in the drawnig, the pawl 131 will come into position ready to actuate the ratchet 130, and the tooth 138 will also be in such a position that the pawl 135 will not only advance the wheel 132 one step, but will also engage the upper face of the pawl 138 and not pass off of the latter until the wheel 132 has been advanced another step. The result of this operation will be to advance the pawl 131 an amount equal to two steps of the wheel, and this advance of the pawl 131 will through ratchet 130 rotate the wheel 125 sufficiently to move a new wrapper into position to have coins supplied thereto. This movement will bring the pocket containing the filled wrapper underneath the mechanism for crimping the open end of the wrapper, and this mechanism, since it is continually reciprocated by its operating connection to the corresponding reciprocating bar 61, will crimp the edge of the wrapper over the top of the stack of coins, thus effectively sealing them in the wrapper. The crimping mechanism will be operated a number of times while a wrapper is positioned beneath the same, but each stroke will tend to further crimp the wrapper and fold it more securely over the ends of the coins. After each advance of the pockets, the pawl 129 in coöperation with the star wheel 128 will prevent any accidental displacement of the mechanism until the next advance of the pockets takes place. In the case of the mechanism shown in Fig. 15, there will be two advances of the coin pockets during each complete revolution of the wheel 132 on account of the fact that two sets of teeth 138 and pawls 131 are provided.

It may happen in the operation of the apparatus that when it is stopped some or all of the wrappers will be only partly filled. Such wrappers, or at least the coins therein, will ordinarily be removed from beneath the coin chutes so that upon a subsequent operation of the apparatus, the coins will be supplied to empty wrappers. It is therefore necessary that the mechanism for counting the coins supplied to the wrappers be reset to its zero position. If the wheels 132 occupy any positions other than those shown in Figs. 14 and 15, rotation of the shaft 127 will through the gear 143 and ratchet 141 turn the wheel 132 until the double space 142 comes into the position shown in these figures, in which case the gear 143 will slide by the ratchet 141 without producing any movement of the latter. This action will occur when the parts of the mechanism are in the positions that they should occupy at the start of an operation of filling a wrapper with coins. Manual operation of the shaft 127 by the crank 144 will thus reset all of the wheels 132 of the wrapping mechanism into their normal position so that upon a subsequent operation of the apparatus, the predetermined numbers of coins may be supplied to the wrappers.

I claim:

1. Coin-controlled apparatus comprising, in combination, a coin-receiving pocket having a movable bottom, a movable member, an operating member, means adapted to operatively connect said movable member to said operating member, means associated with said movable-bottom for rendering said connecting means normally ineffective, and means controlled by a coin in the pocket to render said connecting means effective to cause said operating means to operate the movable member.

2. Coin-controlled apparatus comprising, in combination, a coin-receiving pocket having a coin-discharging opening, a gate normally closing said opening and having a stepped portion normally lying below the pocket, a sliding member carrying said gate, means to move said member to withdraw the stepped portion of the gate from below the pocket, whereby a coin within the pocket will position itself between said stepped portion and the wall of the pocket to hold the member in its moved position, and means to cause a further movement of said member to carry the gate out of registry with the pocket whereby the coin will be permitted to pass therefrom.

3. Coin-controlled apparatus comprising, in combination, a reciprocating member; an actuating bar adapted to be moved by said member; a coin pocket; and a swinging member attached to the bar and adapted to be moved into engagement with the reciprocating member when the bar is moved in one direction by the member, and adapted to be held in engagement with the reciprocating member by a coin in the pocket to permit the bar to be moved in the opposite direction to actuating position.

4. Coin-controlled apparatus comprising, in combination, a reciprocating member; an actuating bar arranged to be moved downwardly by each downward movement of the reciprocating member; a coin pocket; and a swinging member attached to the bar and adapted to be moved into engagement with the reciprocating member when the bar is moved downward by said member, and held in engagement with the reciprocating member by a coin in the pocket to permit the bar to be lifted by the reciprocating member into actuating position.

5. Coin-controlled apparatus comprising, in combination, a reciprocating member, an actuating bar arranged to be moved downwardly by each downward movement of the member, a coin pocket, a swinging member attached to the bar, a movable member having a portion normally lying beneath the coin pocket, means associated with said movable member for moving said swinging member into engagement with the reciprocating member when the bar is moved downward by the reciprocating member, and means associated with the movable member for holding the swinging member in engagement with the reciprocating member when a coin is in the pocket to permit the bar to be lifted by the reciprocating member into actuating position.

6. Coin-controlled apparatus comprising, in combination, a reciprocating member, an actuating bar, a pivoted member attached to the bar, mechanism for periodically moving said member into engagement with the reciprocating member, a coin pocket, a movable bottom for said pocket, and a connection between said bottom and said pivoted member whereby a coin in the pocket will hold the pivoted member in engagement with the reciprocating member to cause the bar to be lifted into actuating position.

7. Coin-controlled apparatus comprising, in combination, a reciprocating member, an actuating bar, a pivoted member attached to the bar, mechanism for periodically moving said member into engagement with the reciprocating member, a coin pocket, a movable bottom for said pocket, a connection between said bottom and said pivoted member whereby a coin in the pocket will hold the pivoted member in engagement with the reciprocating member to cause the bar to be lifted into actuating position, and means whereby said upward movement of the bar will withdraw the bottom from beneath the coin pocket to permit the coin to be discharged therefrom.

8. Coin-controlled apparatus comprising, in combination, a coin-receiving pocket, an actuating bar provided with a notch having sides of different length, a swinging member pivoted to said bar and provided with a slot, a slidable member provided with a shelf coöperating with the coin-receiving pocket, a lug associated with said slidable member and coöperating with the notch in the bar, a pin associated with the slidable member and coöperating with the slot in the swinging member, an actuating member adapted to coöperate with said bar and said swinging member, and means for reciprocating said actuating member to operate said bar.

9. Coin-controlled apparatus comprising, in combination, a coin-receiving pocket, a vertically disposed actuating bar provided with a projecting lug and a notch having inclined sides of different length, a depending swinging member pivoted at its upper end to the upper end of the bar and provided with a slot near its lower end, a horizontally disposed slidable member provided at one end with a shelf adapted to coöperate with the coin-receiving pocket and a stepped portion adapted to engage a coin in said pocket to limit the movement of said slidable member, a spring for normally drawing said slidable member into such position that its stepped portion lies beneath the coin-receiving pocket, a lug extending from said slidable member and coöperating with the sides of the notch in said bar, a pin extending from the slidable member in line with the said lug and coöperating with the slot in the swinging member, and a reciprocating actuating member provided with a lug adapted to engage the lug on the bar to draw the bar downwardly to cause the shorter side of the notch and the coöperating lug to retract said slidable member and through the pin and slot connection place said swinging member in engagement with the actuating member, so that upon upward movement of the latter, the bar will be lifted, said pin and slot connection being so arranged that when said stepped portion engages a coin in the pocket, the said swinging member will be maintained in engagement with said actuating member throughout the entire upward stroke of the latter to cause the bar to be lifted into actuating position.

10. Coin-controlled apparatus comprising, in combination, an inclined coin chute provided with a plurality of coin-receiving pockets, a reciprocating member associated with each of the coin-receiving pockets, an actuating bar associated with each of the coin-receiving pockets, a swinging member attached to each bar and adapted to be moved into engagement with the corresponding reciprocating member and held in engagement therewith by a coin in the pocket to cause the bar to be lifted to actuating position, and means for operating the several reciprocating members in timed relation to the distance through which coins of different denominations pass to reach their respective coin-receiving pockets.

11. In apparatus for registering coins of different denominations, a counter for each denomination of coin, means under the control of a coin of lowest denomination for imparting a step-by-step movement to the units counter to register the coin, means under the control of a coin of next higher denomination for imparting a plurality of step-by-step movements to the units counter to register the coin, means under the control of a coin of a third denomination for imparting a step-by-step movement to the tens counter to register the coin, means under the control of a coin of a fourth denomination for imparting a plurality of step-by-step movements to the units counter and thereafter a plurality of step-by-step movements to the tens counter to register the coin, and means under the control of a coin of a fifth denomination for imparting a plurality of step-by-step movements to the tens counter to register the coin.

12. In coin-handling apparatus provided with mechanism for assorting the coins according to their denomination and a counter-actuating mechanism for each denomination, the combination of a plurality of counters, means coöperating with one of said counter-actuating mechanisms for imparting a step-by-step movement to the units counter to register a coin of lowest denomination, means coöperating with another of said counter-actuating mechanisms for producing a plurality of step-by-step movements of the units counter to register a coin of next higher denomination, means coöperating with another of said counter-actuating mechanisms for imparting a step-by-step movement to the tens counter to register a coin of a third denomination, means coöperating with another one of said counter-actuating mechanisms for imparting a plurality of step-by-step movements to the units counter and thereafter a plurality of step-by-step movements to the tens counter to register a coin of a fourth denomination, and means coöperating with another one of said counter-actuating mechanisms for imparting a plurality of step-by-step movements to the tens counter to register a coin of a fifth denomination.

13. In apparatus for registering coins of different denominations, a plurality of counters, means for imparting a step-by-step movement to the units counter to register a coin of lowest denomination, means operatively connected to said first named means for producing an increased actuation of the same to impart a plurality of step-by-step movements to the units counter to register a coin of next higher denomination, means for imparting a step-by-step movement to the tens counter to register a coin of a third denomination, means operatively connected to said last named means to produce an increased actuation of the same to impart a plurality of step-by-step movements to the tens counter to register a coin of highest denomination, a second means operatively connected to said first named means for producing an increased actuation of the same to impart a plurality of step-by-step movements to the units counter, and means associated with said first named means and adapted to coöperate with said tens-counter-movement-imparting means to produce increased movement thereof to impart to said counter a plurality of step-by-step movements which in conjunction with the movements imparted to said units counter by said second means will cause registration of a coin of intermediate denomination.

14. In coin-handling apparatus provided with mechanism for assorting coins according to their denomination, and a counter-actuating mechanism for each denomination, a plurality of counters, means coöperating with one of said counter-actuating mechanism for imparting a step-by-step movement to the units counter to register a coin of lowest denomination, means coöperating with another of said counter-actuating mechanisms and operatively associated with said first named means for producing increased actuation of the same to impart a plurality of step-by-step movements to the units counter to register a coin of a second denomination, means coöperating with another one of said counter-actuating mechanisms for imparting a step-by-step movement to the tens counter to register a coin of a third denomination, means coöperating with another one of said counter-actuating mechanisms and operatively related to said tens-counter-movement-imparting means for producing increased actuation of the same to register a coin of highest denomination, a second means coöperating with another one of said counter-actuating mechanisms and operatively associated with said first named means for producing an increased actuation of the same to impart a plurality of step-by-step movements to the units counter, and means associated with said first named means and adapted after said second means has functioned to coöperate with said ten-counter-movement-imparting means to produce an increased movement of the same to impart a plurality of step-by-step movements to the tens counter upon actuation of said second means by the counter-actuating mechanism coöperating therewith.

15. In apparatus for registering coins of different denominations, a plurality of counters, a shaft, means connected to said shaft for operating the tens counter according to coins of different denominations, a member rotatably mounted on said shaft and provided with means for operating the units counter according to coins of other denominations, and means associated with said rotatable member and adapted to coöperate with said means connected to the shaft for imparting to said means a movement to operate the tens counter whereby the units and tens counters are actuated from said rotatable member to register coins of another denomination.

16. In apparatus for registering coins of different denominations, a plurality of counters, a shaft, means mounted on the shaft for operating the tens counter, a plurality of gears associated with said shaft whereby the same may be actuated to cause different amounts of movement to be imparted to said tens counter, a sleeve surrounding said shaft, gear connections between said sleeve and the units counter, a plurality of gears associated with said sleeve, whereby different amounts of movement may be imparted thereto according to the denomination of coins to produce corresponding movement of said units counter, and means associated with said sleeve and adapted to engage the means connected to said shaft, so that when said sleeve is actuated in accordance with a particular denomination of coins, the movement imparted to the tens counter immediately follows a movement imparted to the units counter through said sleeve and gear connections, whereby coins of said particular denomination are registered upon the units and tens counters, acting conjointly.

In testimony whereof I affix my signature.

EDWARD B. PAUL.